(No Model.)
J. F. GEBHART.
WEIGHING APPARATUS FOR CARDING ENGINES.
No. 273,980. Patented Mar. 13, 1883.
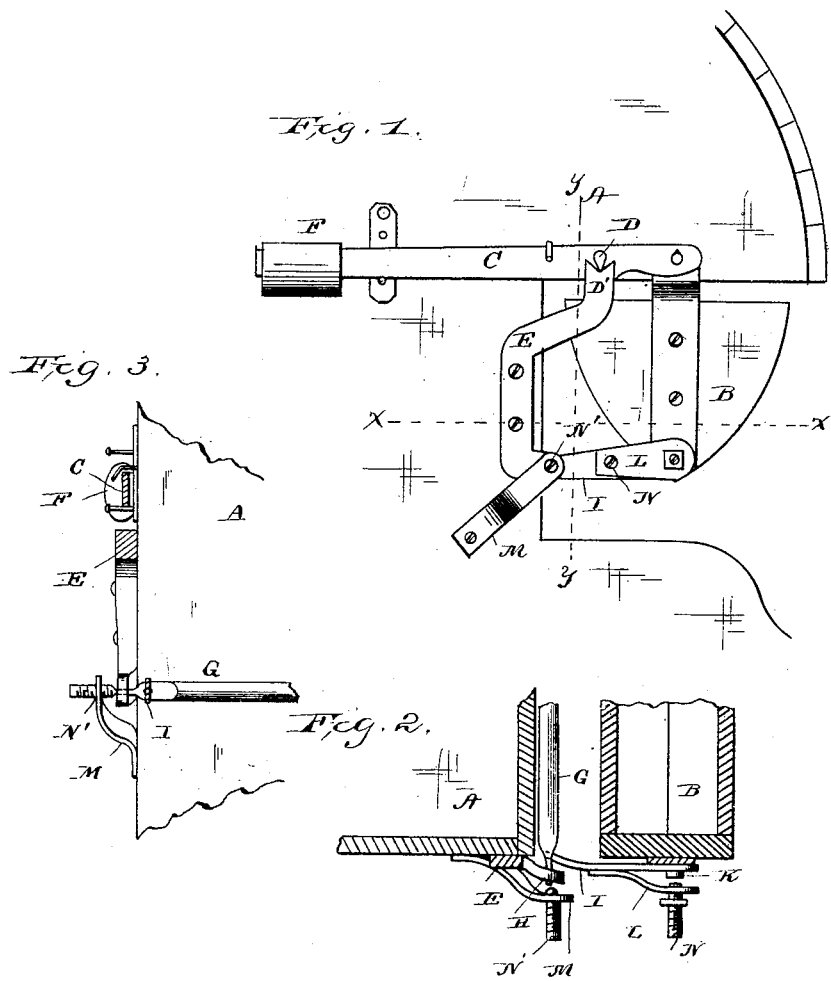

UNITED STATES PATENT OFFICE.

JOHN F. GEBHART, OF NEW ALBANY, INDIANA.

WEIGHING APPARATUS FOR CARDING-ENGINES.

SPECIFICATION forming part of Letters Patent No. 273,980, dated March 13, 1883.

Application filed March 17, 1882. (No model.)

*To all whom it may concern:*

Be it known that I, JOHN F. GEBHART, of New Albany, in the county of Floyd, and in the State of Indiana, have invented certain new and useful Improvements in Weighing Apparatus for Carding-Engines; and I do hereby declare that the following is a full, clear, and exact description thereof, reference being had to the accompanying drawings, and to the letters of reference marked thereon, making a part of this specification.

This invention relates to that class of devices which are known as "weighing apparatus for carding-engines;" and it has for its objects to provide mechanism whereby the trough of the scales may be adjusted so as to prevent lateral movement and insure accuracy in weighing the wool, whereby much better and more uniform yarns may be obtained from wool, or wool and cotton mixed, or wool, cotton and shoddy, than has heretofore been accomplished. These objects I attain by the devices and mechanism illustrated in the accompanying drawings, in which—

Figure 1 represents a side elevation of a portion of the weighing apparatus of a carding-engine, showing my improvements applied thereto, and Fig. 2 represents a sectional view of my improved mechanism, taken on the line $x\ x$ of Fig. 1. Fig. 3 represents a sectional view on the line $y\ y$ of Fig. 1.

The letter A indicates the upper portion of the frame of the weighing apparatus, which may be of the ordinary or any approved form.

The letter B indicates the trough, which is constructed as usual, and is suspended from the balance-beams C, which are supported or fulcrumed on knife-edges D in suitable recesses, D', in the upper ends of the brackets E, which are secured to the frame of the apparatus at each side. The balance-beams are provided with the usual weights, F, to weigh the wool or other material. The lower portion of the trough at each end is connected with a shaft, G, journaled transversely of the machine in bearings H in the lower ends of the brackets before mentioned, by means of the short arms I, which are loosely secured to the trough by means of the short pins K. The said arms are provided with brackets L, having set-screws N, adapted to bear against the ends of the pins to adjust the trough with respect to the arms. The frame of the apparatus is also provided with similar brackets, M, and set-screws N', which are adapted to bear against the end of the transverse shaft in order to assist in the adjustment of the trough. The set-screws may be provided with lock-nuts, if desired, whereby they may be held to their places when adjusted.

By the joint and separate arrangements of the devices above enumerated a more uniform quality of yarn is produced than by the apparatus heretofore in use, for the reason that the trough, as connected to the scale-beams, will act upon each alike, irrespective of any irregularity of distribution of the material fed in, as by the connections the trough cannot tip to either side if the weight of material should be greater at one side, thus securing accuracy in weighing, upon which the quality of the yarn to a great extent depends.

Having thus described my invention, what I claim, and desire to secure by Letters Patent, is—

1. In combination with the balance-beams and transversely-hung shaft, the short arms I and connecting-pins K, the trough B, brackets L, and screws N, the whole arranged and adapted to operate substantially in the manner specified.

2. In combination with the trough, balance-beams, transversely-hung shaft, and connecting-arms, the set-screws passing through suitable brackets and adapted to bear against the ends of the shaft, substantially as and for the purposes set forth.

3. The combination of the trough and balance-beams with the connecting-arms and transversely-hung shaft, the brackets and the set-screws adapted to bear against the ends of the pins by which the arms are secured to the ends of the trough and the transverse shaft respectively, whereby the parts may be adjusted substantially as set forth.

In testimony whereof I affix my signature, in presence of two witnesses, this 16th day of March, 1882.

J. F. GEBHART.

Witnesses:
J. J. MCCARTHY,
CHAS. D. DAVIS.